United States Patent
Gulbransen et al.

(10) Patent No.: US 7,492,399 B1
(45) Date of Patent: Feb. 17, 2009

(54) HIGH DYNAMIC RANGE DUAL MODE CHARGE TRANSIMPEDANCE AMPLIFIER/SOURCE FOLLOWER PER DETECTOR INPUT CIRCUIT

(75) Inventors: David J. Gulbransen, Santa Barbara, CA (US); Alan W. Hoffman, Goleta, CA (US); John T. Caulfield, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 710 days.

(21) Appl. No.: 10/781,268

(22) Filed: Feb. 17, 2004

(51) Int. Cl.
*H04N 3/14* (2006.01)
*H04N 5/335* (2006.01)
*H01L 27/00* (2006.01)

(52) U.S. Cl. .................... 348/294; 250/208.1

(58) Field of Classification Search ............... 348/294, 348/297, 308, 312; 250/208.1, 214 R, 214 AL
See application file for complete search history.

(56) References Cited

U.S. PATENT DOCUMENTS

| | | | |
|---|---|---|---|
| 4,445,117 A | 4/1984 | Gaalema et al. | 340/14.63 |
| 4,786,831 A | 11/1988 | Morse et al. | 327/566 |
| 5,083,016 A | 1/1992 | Wyles et al. | 250/208.1 |
| RE34,908 E | 4/1995 | Wyles et al. | 250/208.1 |
| 6,727,946 B1 * | 4/2004 | Zhao et al. | 348/308 |
| 6,909,126 B1 * | 6/2005 | Janesick | 257/184 |
| 2004/0079977 A1 * | 4/2004 | Ying et al. | 257/292 |

* cited by examiner

*Primary Examiner*—Yogesh Aggarwal
(74) *Attorney, Agent, or Firm*—Leonard A Alkov

(57) ABSTRACT

Disclosed is a High Dynamic Range Dual Mode (HDR-DM) input circuit unit cell (10) for use with an infrared (IR) radiation detector (D1). The readout circuit unit cell includes a plurality of transistors (M1, M2, M3 and M4), switches (S1, S2 and S3), and capacitances ($C_{fb}$, $C_{bl}$ and $C_{SH}$) that are controllably coupled together to form, in a first mode of operation below an illumination level threshold, a CTIA input circuit (12), and to form, in a second mode of operation above the illumination level threshold, a lower gain SFD input circuit (14).

18 Claims, 2 Drawing Sheets

HIGH DYNAMIC RANGE DUAL MODE CHARGE TRANSIMPEDANCE AMPLIFIER/SOURCE FOLLOWER PER DETECTOR INPUT CIRCUIT

TECHNICAL FIELD

This invention relates generally to electronic readout circuits for use with detectors of electromagnetic energy and, more specifically, relates to a Capacitive Transimpedance Amplifier (CTIA)/Source Follower per Detector (SFD) input circuit for use with a readout integrated circuit.

BACKGROUND

Visible, Near Infrared (NIR), and Short Wave Infrared (SWIR) imagers can encounter up to a nine order of magnitude range in input photon flux density. As such, these imagers require a very wide dynamic range. For example, the illumination level (lux) of a moonless, clear night sky is about $10^{-3}$, that of a full moon is about $10^{-1}$, while that of full daylight is $1-2\times10^4$, and direct sunlight is $1-1.3\times10^5$. This very wide dynamic range requirement has historically prevented a single sensor from operating over more than a fraction of the total dynamic range. For example, a sensor optimized for a moonless or even a moonlit night is essentially blinded or saturated in daylight.

Conventional readout circuit amplifier types include a high gain amplifier type known as the charge transimpedance amplifier (CTIA), sometimes referred to as a reset integrator, while a lower gain amplifier type is known as a source follower per detector (SFD). Reference in this regard can be made to, as examples U.S. Pat. No. 4,445,117, "Transistorized Focal Plane Having Floating Gate Output Nodes", by Steven D. Gaalema et al.; U.S. Pat. No. Re. 34,908, "3-Transistor Source Follower-Per-Detector Unit Cell for 2-Dimensional Focal Plane Arrays", by Richard H. Wyles et al.; and U.S. Pat. No. 4,786,831, "Integrating Capacitively Coupled Transimpedance Amplifier", by Arthur L. Morse et al. The disclosures of these now commonly assigned U.S. patents are incorporated by reference herein their entireties.

The wide dynamic range imager requirement has been approached in a conventional readout circuit by the use of a single circuit type, such as the CTIA, that is configured to have two or more distinct gains and variable integration times. However, the use of multiple gains in such circuits becomes progressively more difficult as the readout circuit unit cell size is made smaller, as is typically the case when the number of discrete imager pixels is increased.

Other conventional approaches to accommodating the wide dynamic range requirement include the use of a current mirror, or the use of a resistor load gate modulation circuit. While these two types of circuits are capable of operation over a wide dynamic range, they suffer from poor uniformity and are difficult to calibrate. These circuits also suffer from poor frequency response at very low light levels.

Prior to this invention the problems presented by the inherent wide dynamic range requirement of modern radiation sensors arrays have not been adequately addressed.

SUMMARY OF THE PREFERRED EMBODIMENTS

The foregoing and other problems are overcome, and other advantages are realized, in accordance with the presently preferred embodiments of these teachings.

This invention combines in one readout circuit unit cell circuitry that is controllably configurable to form one of a higher gain amplifier and a lower gain amplifier. The higher gain amplifier in accordance with a presently preferred embodiment is a charge transimpedance amplifier (CTIA) input circuit, while the lower gain amplifier is a source follower per detector (SFD) input circuit. The two separate circuit types (CTIA and SFD) operate in distinct gain states. The use of these two types of input circuits provides superior performance over a wider dynamic range than could be covered in accordance with prior art approaches that are known to the inventors.

In one aspect this invention provides a readout circuit unit cell for use with a radiation detector, and a method of operating same. The readout circuit unit cell includes a plurality of capacitances, switches and transistors that are programmably coupled together to form one of a first amplifier circuit having a first gain state or a second amplifier circuit having a second gain state that differs from the first gain state.

In another aspect this invention provides a readout circuit unit cell for use with an infrared (IR) radiation detector. The readout circuit unit cell includes a plurality of capacitances, switches and transistors that are controllably coupled together to form, in a first mode of operation below an illumination level threshold, a CTIA input circuit, and to form, in a second mode of operation above the illumination level threshold, a lower gain SFD input circuit.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
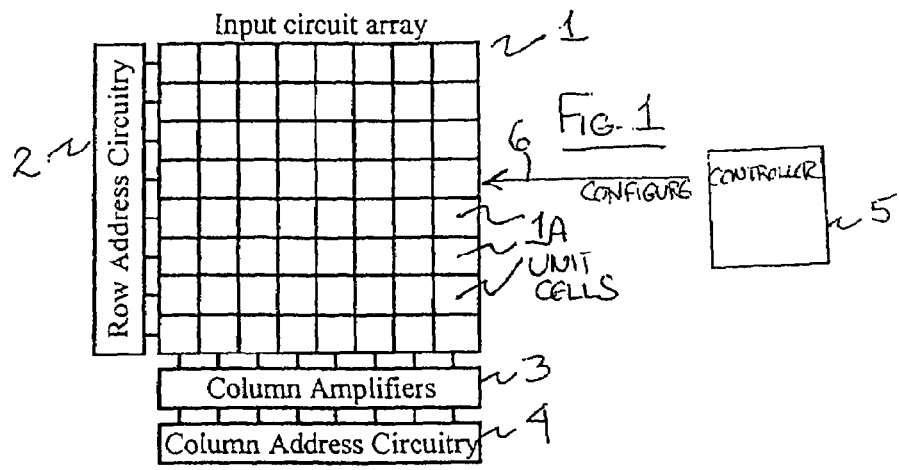
FIG. 1 is simplified diagram of a two dimensional imager array.

FIG. 1 is simplified diagram of a two dimensional imager array, and shows an input circuit array 1, row address circuitry 2, column amplifiers 3 and column address circuitry 4. This invention is most concerned with the construction of individual units cells 1A of the input circuit array 1.

Figure 2:
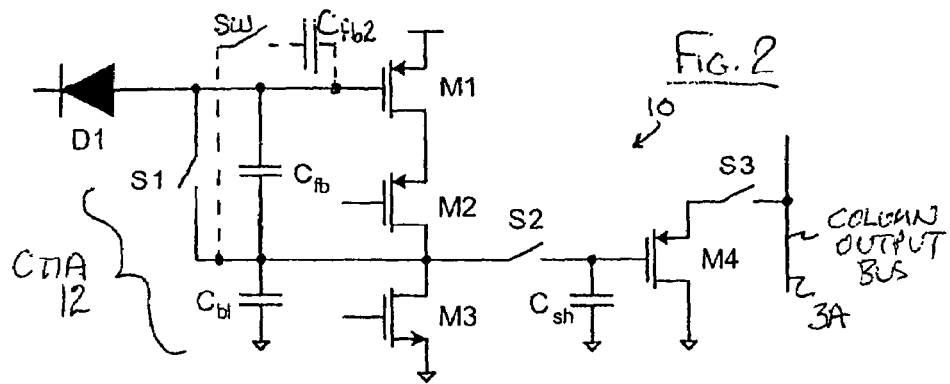
FIG. 2 is a schematic diagram of an embodiment of a High Dynamic Range Dual Mode CTIA/SFD input circuit, configured as shown as a CTIA with a Sample/Hold in accordance with a embodiment of this invention.

A schematic diagram of a High Dynamic Range Dual Mode (HDR-DM) CTIA/SFD input circuit unit cell 10 is shown in FIG. 2. The HDR-DM CTIA/SFD input circuit unit cell 10 is constructed with a core group of electrical components that are programmably configurable during operation, such as by a controller 5 over a configuration bus 6 (shown in FIG. 1), so as to operate in a higher gain or a lower gain amplifier configuration, and to thereby cover a wider dynamic range, while still providing good uniformity and performance, than was possible with the prior art approaches. In general, the controller 5 configures the core group of electrical components to form the higher gain amplifier configuration (e.g., a CTIA configuration) below an illumination level threshold, and the lower gain amplifier configuration (e.g., a SFD configuration) above the illumination level threshold.

The core group of electrical components, per unit cell 1A, is comprised of transistors M1, M2, M3 and M4, switches (also preferably implemented as transistors) S1, S2 and S3, and capacitances C feedback ($C_{fb}$), C band-limit ($C_{bl}$) and C sample-and-hold ($C_{SH}$). M4 is a source follower transistor used as an output transistor in the CTIA mode of FIG. 2 and in the SFD mode of FIG. 3. M4 is coupled to a column output bus 3A that connects to one of the column amplifiers 3. S3 is driven by a row enable signal to readout the unit cell 1A to the column amplifier 3 at a desired time.

In FIG. 2 the transistors M1, M2, M3, S1, and capacitors Cfb, and Cbl together form a CTIA circuit 12. D1 is an associated optical radiation photodetector, such as an infrared (IR) radiation detector. In the illustrated configuration the CTIA 12 is similar in some respects to the CTIA embodiments disclosed in the above-captioned U.S. Pat. No. 4,786,831, "Integrating Capacitively Coupled Transimpedance Amplifier", by Arthur L. Morse et al. The closed loop gain of the CTIA 12 is determined by the value of $C_{fb}$. Non-limiting examples of the value of $C_{fb}$ are a capacitance in the range of about 4 femtofarads to about 30 femtofarads. Note that if sufficient area is available in the integrated circuit layout for two additional components, a second capacitor $C_{fb2}$ in series with a switch (SW) may be placed in parallel with $C_{fb}$ to add an additional gain state to the CTIA 12, thereby further extending the effective dynamic range of the CTIA 12 portion of the HDR-DM input circuit unit cell 10. The value of $C_{bl}$ sets the noise bandwidth of the CTIA 12. The gate of M2 is coupled during CTIA operation to a cascode voltage that holds the source of M2, and thus the drain of M1 at a substantially constant potential, despite variations felt at the drain of M2. M3 functions as a current source for M1 in the CTIA mode, and the gate of M3 is coupled to a suitable bias potential for setting the desired output of the current source. The switches S2 and S3, capacitor $C_{sh}$, and transistor M4 form a sample/hold amplifier-based circuit to enable a snapshot, integrate-while-read operation of the CTIA 12 input circuit. Such unit cell output sampling stages are known for use with CTIA circuits.

With appropriate timing of the switches S1 and S2, the time interval over which the photocurrent from diode D1 is integrated can be varied over a range of at least three to four orders of magnitude. For example, the integration time may range from about 33 milliseconds to about 3 microseconds for a sensor operating at a frame rate of 30 Hz. The absolute instantaneous flux range that can be accommodated is determined by the capacitance value of $C_{fb}$ and the available output range of the CTIA 12. While the value of $C_{fb}$ may be selected to accommodate substantially all of the scene dynamic range, the sensitivity available for low flux scenes (such as night scenes) would be less than adequate for most applications of interest. If $C_{fb}$ is instead selected to provide optimal sensitivity for the low flux scenes, the CTIA 12 will rapidly saturate in higher flux scenes.

Figure 3:
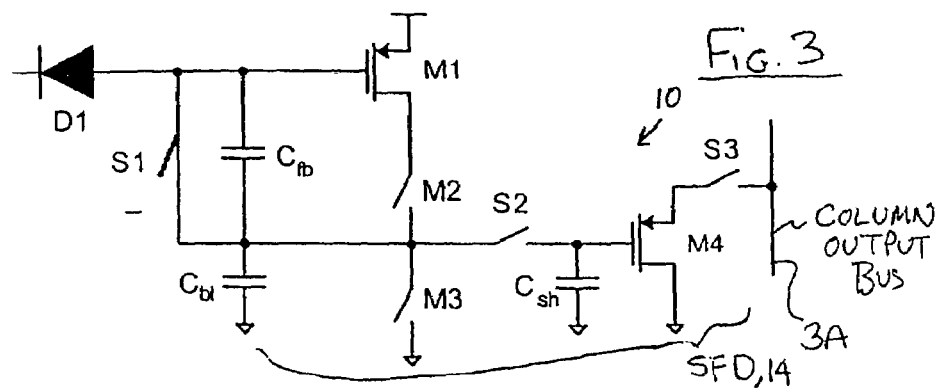
FIG. 3 is a schematic diagram of the embodiment of the High Dynamic Range Dual Mode CTIA/SFD input circuit, configured as shown as a SFD.

In accordance with this invention, the CTIA input circuit 12 depicted in FIG. 2 can be programmably reconfigured as shown in FIG. 3 to form a second type of input circuit which, in the presently preferred embodiment, is a SFD input circuit 14. In this case switch S1 is closed, transistor M2 is turned off, also turning off M1, and transistor M3 is used as a reset switch for $C_{bl}$ and $C_{sh}$, thereby forming the SFD input circuit 14.

In the SFD mode of operation the integration of the photocurrent generated by D1 now occurs on the capacitors $C_{bl}$ and $C_{sh}$. However, the junction capacitance of the photodiode D1, the gate to source capacitance of transistor M1 and a portion of the gate capacitance of transistor M4 all add to the total integration capacitance, $C_{int}$. The integration charge capacity of this configuration is determined by the total integration capacitance, the useable input voltage swing of the source follower transistor M4, and the available reverse bias range of diode D1. The integration interval in this configuration is controlled by transistor M3 and switch S2. M3 in this case no longer functions as a current source transistor, but is used instead as an integration reset switch.

Figure 4:
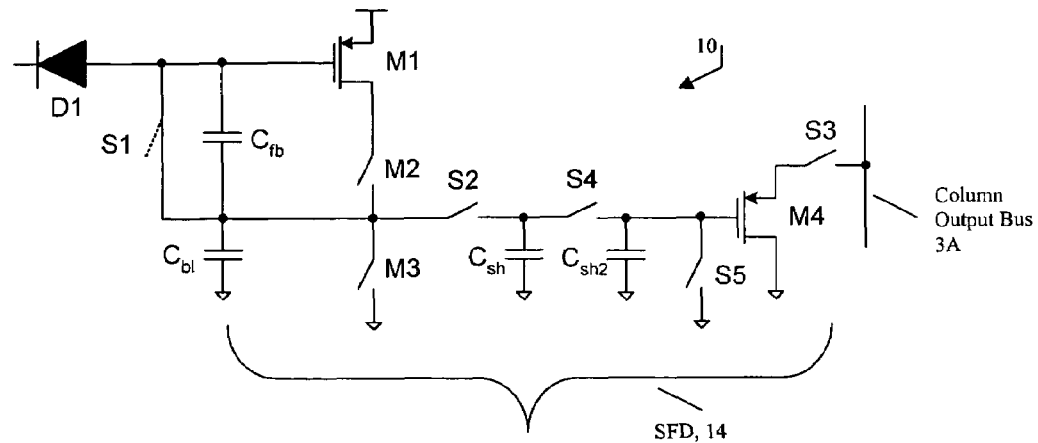
FIG. 4 is a schematic diagram of the embodiment of the High Dynamic Range Dual Mode CTIA/SFD input circuit, configured as shown as a SFD and modified with a second sample/hold stage to allow snapshot integrate while read operation.

When configured as shown in FIG. 3 the SFD input circuit 14 operates in two integration modes: snapshot integrate-then-read (ITR) and progressive scan integrate while read (IWR). In either case S2 remains closed during operation so that the photocurrent is integrated onto both $C_{bl}$ and $C_{sh}$. By adding a second sample/hold switch S4, a second reset switch S5, and a capacitor $C_{sh2}$, snapshot IWR operation can be realized, as shown in FIG. 4.

The HDR-DM CTIA/SFD input circuit 10 is amenable to being fabricated in a 20 micron×20 micron unit cell area in accordance with a 0.5 micron-well CMOS process that uses two layers of polysilicon and five metal layers.

While the HDR-DM CTIA/SFD input circuit 10 is particularly useful when coupled with a SWIR imager, this invention can be employed to advantage with any similar imaging sensor in any spectral band where a wide total dynamic range is encountered. The HDR-DM CTIA/SFD input circuit 10 can be used in a monolithic embodiment, where the radiation detector is part of the readout circuit, or in a hybrid embodiment, where the radiation detector is located on a separate substrate, such as a silicon substrate, a Group II-VI substrate, or a Group III-V substrate, that is electrically and mechanically bonded to the readout circuit, such as through conventional Indium bump cold weld technology.

Using the reconfigurable unit cell input circuitry in accordance with this invention a wide dynamic range of input light flux can be accommodated. Note that the dynamic range of the CTIA circuit 12 may overlap the dynamic range of the SFD circuit 14, or they may be disjoint.

The following table provides representative ranges of unit cell size, gain for the CTIA and SFD embodiments, as well as examples of values for $C_{bl}$ and $C_{sh}$.

|  | Specific Implementation for Readout | Range of Possible Values |
| --- | --- | --- |
| Unit Cell Size | 20 μm × 20 μm | 15 μm × 15 μm and larger |
| CTIA Gain |  | (for a 20 μm × 20 μm cell) |
| $C_{fb}$ | 5 fF | 3 fF-30 fF |
| Transimpedance | 32 μV/electron | 5.3-53 μV/electron |
| SFD Gain |  | (for a 20 μm × 20 μm cell) |
| $C_{int}$ (assumes 80 fF $C_{det}$) | 366 fF | 100-500 fF |
| Transimpedance | 437 nV/electron | 320-1600 nV/electron |
| $C_{bl}$ | 53.1 fF | 10-100 fF |
| $C_{sh}$ | 204 fF | 100-300 fF |

Figure 5:
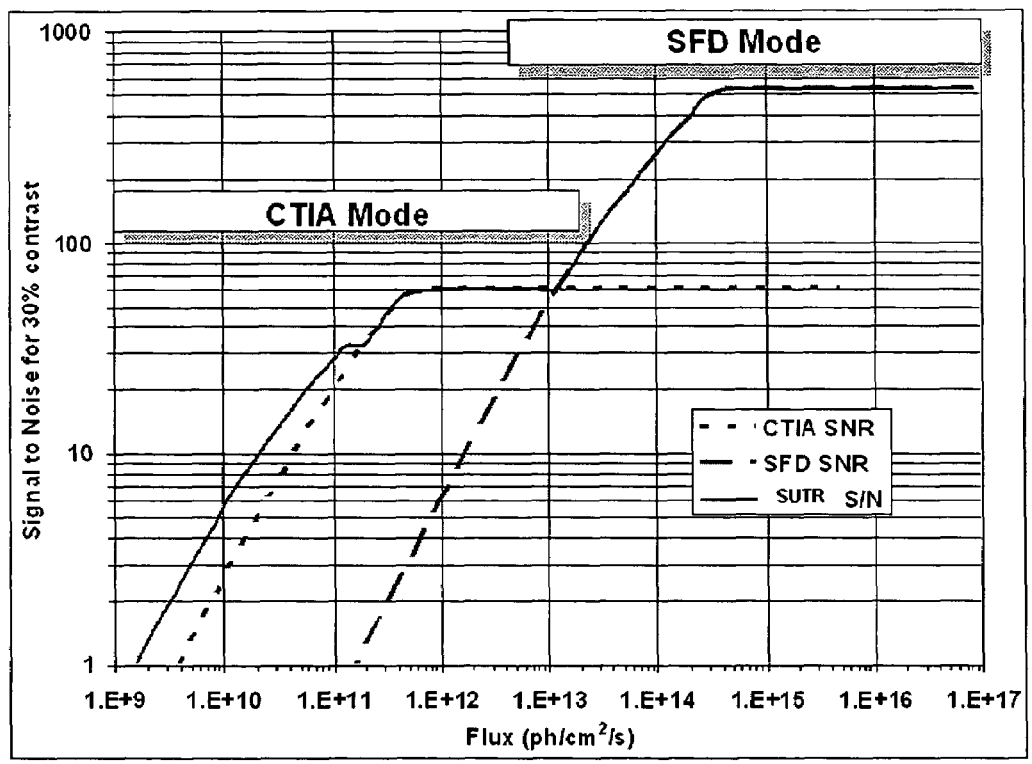
FIG. 5 is a simplified diagram of a signal to noise ratio for a 30% contrast target.

FIG. 5 shows an analysis based on an expected performance of the design implementation using an InGaAs detector array. This analysis assumes a constant target to background contrast ratio of 30% to determine the signal-to-noise ratio (SNR) achievable in both the CTIA and SFD operating modes. At low background, the CTIA achieves superior SNR. At moderate backgrounds the two circuits provide roughly equivalent performance, while at high background the SFD is superior. At the lowest background, another CTIA operating mode referred to as Sample Up the Ramp (SUTR) is utilized to provide a ~4× reduction in readout noise. This is achieved by allowing the CTIA to integrate over several readout periods. External electronics can then perform a frame to frame subtraction to calculate the signal that has accumulated over a single readout period in each pixel (i.e., signal=frame$_n$−frame$_{n-1}$). This calculation removes any correlated noise between the two frames of data, specifically the reset noise. For the implementation illustrated, the SUTR mode achieves a 33 electron read noise versus the 113 electron read noise achieved by resetting the CTIA in each frame. The readout can be configured to operate in this mode as well with the frequency of reset controlled from the external electronics.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent component values, integration times, and numbers of capacitors, transistors and switches may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A readout circuit unit cell for use with a radiation detector, comprising a plurality of capacitances, switches and transistors that are programmably coupled together such that when programmed in a first configuration the plurality of capacitances, switches and transistors comprise a first amplifier circuit having a first gain state and when programmed in a second configuration the plurality of capacitances, switches and transistors comprise a second gain state that differs from the first gain state, where said first amplifier circuit is comprised of a Charge Transimpedance Amplifier (CTIA) input circuit, and where said second amplifier circuit is comprised of a Source Follower per Detector (SFD) input circuit, wherein across said CTIA input circuit at least one capacitance is in parallel with at least one transistor.

2. A readout circuit unit cell as in claim 1, where the first gain state is wider than the second gain state.

3. A readout circuit unit cell as in claim 1, where the first gain state overlaps the second gain state.

4. A readout circuit unit cell as in claim 1, where said plurality of capacitances, switches and transistors are programmably coupled together to form said first amplifier circuit below an illumination level threshold, and are programmably coupled together to form said second amplifier circuit above said illumination level threshold.

5. A readout circuit unit cell as in claim 1, comprising a sample/hold circuit for coupling the unit cell to an output bus, where said sample/hold circuit comprises said SFD input circuit.

6. A readout circuit unit cell as in claim 1, where said SFD input circuit operates in one of at least two integration modes: a snapshot integrate-then-read (ITR) mode and a progressive scan integrate-while-read (IWR) mode.

7. A readout circuit unit cell as in claim 1, where one of said transistors is configured when operating in a CTIA mode to function as a current source for a CTIA amplifier, and operates as a reset switch when operating in a SFD mode.

8. A method to operate a readout circuit unit cell with a radiation detector, comprising:
    providing the readout circuit unit cell to have a plurality of components that comprise capacitors, switches and transistors; and
    coupling together said plurality of components such that when programmed in a first mode of operation the plurality of components comprise a first photocurrent amplifier circuit having a first gain state and when programmed in a second mode of operation the plurality of components comprise a a second photocurrent amplifier circuit having a second gain state that differs from the first gain state, where said first amplifier circuit is comprised of a Charge Transimpedance Amplifier (CTIA) input circuit, and where said second amplifier circuit is comprised of a Source Follower per Detector (SFD) input circuit, wherein across said CTIA input circuit at least one capacitance is in parallel with at least one transistor.

9. A method as in claim 8, where the first gain state is wider than the second gain state.

10. A method as in claim 8, where the first gain state overlaps the second gain state.

11. A method as in claim 8, where said plurality of capacitances, switches and transistors are coupled together to form said first amplifier circuit below an illumination level threshold, and are coupled together to form said second amplifier circuit above said illumination level threshold.

12. A method as in claim 8, where said plurality of capacitances, switches and transistors comprise a sample/hold circuit for coupling the unit cell to an output bus, where said sample/hold circuit comprises said SFD input circuit.

13. A method as in claim 8, comprising operating said SFD input circuit in one of at least two integration modes: a snapshot integrate-then-read (ITR) mode and a progressive scan integrate-while-read (IWR) mode.

14. A method as in claim 8, where one of said transistors is configured when operating in a CTIA mode to function as a current source for a CTIA amplifier, and operates as a reset switch when operating in a SFD mode.

15. A readout circuit unit cell for use with an infrared (IR) radiation detector, comprising a plurality of capacitances, switches and transistors that are controllably coupled together to form, such that when programmed in a first mode of operation operating below an illumination level threshold the plurality of capacitances, switches and transistors comprise a Charge Transimpedance Amplifier (CTIA) input circuit, and when programmed in a second mode of operation operating above the illumination level threshold the plurality of capacitances, switches and transistors comprise a lower gain Source Follower per Detector (SFD) input circuit, wherein the readout circuit unit cell further comprises a sample/hold circuit for coupling the unit cell to an output bus, wherein across said CTIA input circuit at least one capacitance is in parallel with at least one transistor.

16. A readout circuit unit cell as in claim 15, comprising a sample/hold circuit for coupling the unit cell to a column amplifier via a column output bus, where said sample/hold circuit comprises said SFD input circuit.

17. A readout circuit unit cell as in claim 15, where said SFD input circuit operates in one of at least two integration modes: a snapshot integrate-then-read (ITR) mode and a progressive scan integrate-while-read (IWR) mode.

18. A readout circuit unit cell as in claim 15, where one of said transistors is configured when operating in a CTIA mode to function as a current source for a CTIA amplifier, and operates as an integration reset switch when operating in a SFD mode.

* * * * *